United States Patent
Nobis et al.

(10) Patent No.: US 8,650,766 B2
(45) Date of Patent: *Feb. 18, 2014

(54) TARGET SYSTEM, SET OF TARGET SYSTEMS AND DEVICE FOR OPTICALLY ALIGNING AN AXLE

(75) Inventors: Guenter Nobis, Nuertingen (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

This patent is subject to a terminal disclaimer.

(21) Appl. No.: 13/063,437

(22) PCT Filed: Aug. 28, 2009

(86) PCT No.: PCT/EP2009/061147
§ 371 (c)(1),
(2), (4) Date: Aug. 31, 2011

(87) PCT Pub. No.: WO2010/028965
PCT Pub. Date: Mar. 18, 2010

(65) Prior Publication Data
US 2011/0302795 A1    Dec. 15, 2011

(30) Foreign Application Priority Data
Sep. 12, 2008  (DE) .......................... 10 2008 042 019

(51) Int. Cl.
*G01B 11/275*   (2006.01)
(52) U.S. Cl.
USPC ......................................... 33/288; 33/203.18
(58) Field of Classification Search
USPC ................. 33/288, 203.18, 293, 600, 203.19, 33/203.2, 264, 335–337; 73/1.79
See application file for complete search history.

(56) References Cited

U.S. PATENT DOCUMENTS

| 5,535,522 | A  | * | 7/1996 | Jackson | 33/288 |
| 5,675,515 | A  | * | 10/1997 | January | 700/279 |
| 6,134,792 | A  |   | 10/2000 | January | |
| 6,323,776 | B1 |   | 11/2001 | Jackson et al. | |
| 6,412,183 | B1 | * | 7/2002 | Uno | 33/203.12 |
| 6,690,456 | B2 | * | 2/2004 | Bux et al. | 356/139.09 |
| 7,230,694 | B2 | * | 6/2007 | Forster et al. | 356/139.03 |
| 7,637,023 | B2 | * | 12/2009 | Dickinson | 33/293 |
| 7,877,883 | B2 | * | 2/2011 | Schommer et al. | 33/203 |
| 7,908,751 | B2 | * | 3/2011 | Nobis et al. | 33/288 |
| 8,448,342 | B2 | * | 5/2013 | Nobis et al. | 33/288 |
| 2004/0139620 | A1 | * | 7/2004 | Stopa | 33/203.18 |
| 2007/0068016 | A1 |   | 3/2007 | Stieff et al. | |
| 2008/0209744 | A1 |   | 9/2008 | Stieff et al. | |
| 2008/0289202 | A1 | * | 11/2008 | Kassouf et al. | 33/288 |
| 2011/0221867 | A1 | * | 9/2011 | Nobis et al. | 348/46 |

FOREIGN PATENT DOCUMENTS

| CN | 1566903 |   | 1/2005 |
| CN | 1566903 | A * | 1/2005 |

* cited by examiner

*Primary Examiner* — Christopher Fulton
(74) *Attorney, Agent, or Firm* — Kenyon & Kenyon LLP

(57) ABSTRACT

A target system for optical chassis alignment includes a target and a target mounting element having a target receiving element to which the target is attached. The target mounting element is attachable to a wheel of a motor vehicle so that the target is aligned at an angle to the wheel center plane. A significant mark at a known distance from a reference plane and at least two additional undetermined marks are situated on the target.

9 Claims, 5 Drawing Sheets

TARGET SYSTEM, SET OF TARGET SYSTEMS AND DEVICE FOR OPTICALLY ALIGNING AN AXLE

FIELD OF THE INVENTION

The present invention relates to a target system for optically aligning an axle, a set of at least two target systems and a device for optically aligning wheels of a motor vehicle.

BACKGROUND INFORMATION

It is believed that there are methods and devices for providing optical chassis alignment, in which control point fields of targets are recorded by monoscopic image recording devices. The position of these control points in a local three-dimensional target coordinate system is known from the evaluation unit of the measuring system, and the evaluation unit is able to use this to determine the relevant chassis parameters of the motor vehicle.

Such targets having control point fields situated on them are very complex; they place a high demand on the manufacturing of such targets and are accordingly relatively expensive.

SUMMARY OF THE INVENTION

An object of the exemplary embodiments and/or exemplary methods of the present invention is therefore to provide a target system for chassis alignment which requires less complexity and may therefore be manufactured cost-effectively and is equally suitable for chassis alignment. Furthermore, a cost-effective device for optically aligning axles of wheels of a motor vehicle which is simple to operate and delivers very precise measured values is to be provided.

This objective is achieved by the embodiments described herein. Advantageous refinements are also further described herein.

The target systems of the exemplary embodiments and/or exemplary methods of the present invention according to the descriptions herein are particularly suitable for a reliable chassis alignment. They are less complex and may therefore be manufactured more simply and cost-effectively.

In the target system according to the description herein, it is sufficient if one significant mark at a known distance from a reference plane is present. The remaining at least two additional marks may be undetermined.

In the target system according to the description herein, it is sufficient if a first significant mark at a known distance from a reference plane is present, and a second significant mark at a known distance from the first significant mark is present. The at least one additional mark may be undetermined.

In the target system according to the description herein, it is sufficient if a first significant mark at a known distance from a reference plane is present, and a second significant mark at a known distance from a reference plane is present. The at least one additional mark may be undetermined.

The optical features on the target do not form a control point system, i.e., their position in a local coordinate system is unknown.

In order to perform an axle alignment according to the exemplary embodiments and/or exemplary methods of the present invention, it is sufficient if three marks are present on the target. The significant mark according to the description herein or the two significant marks according to the further descriptions herein may be used for the calibration step.

In the calibration step, an image sequence of the significant mark and the at least two additional undetermined marks of the target system according to the description herein or the significant marks and the at least one additional undetermined mark of the target system according to the further descriptions herein is recorded. When the wheels are rolled, each of these marks traces a circular path. An evaluation unit determines a local 3D coordinate system, the spatial position of the wheel rotational axis in the local 3D coordinate system for compensation of the wheel rim run-out and the position of the wheel center plane in the local 3D coordinate system. This may be used to determine the longitudinal center plane of the vehicle. The data are stored in the evaluation unit for the subsequent measurement.

The position of the image recording device or the image recording devices in a common measuring station system is known to the evaluation unit, if necessary by using cross-reference cameras.

After the calibration step and before the actual measurement, the base plates are unlocked, causing the wheels to relax on the contact surface.

In the actual measurement following the calibration step, a single recording of at least three marks of the respective target is made for determining the toe-in and camber by the respective image recording device which may be designed as a stereo camera system or as a mono camera system. Since the local 3D coordinate system of the marks of the targets were determined in the calibration step, the position of the at least three recorded marks indicates the spatial position of the respective wheel axle in the known 3D coordinate system, and the toe-in and camber of the respective wheel may be ascertained from this.

According to another specific embodiment of the present invention, it is no longer necessary to consider the significant mark or the significant marks after the calibration step; it is entirely sufficient if three undetermined marks which were determined together with the significant mark in the calibration step in the local 3D coordinate system are recorded in the actual measurement by the measuring heads.

If a second significant mark at a known distance from the first significant mark is provided, as is the case in the target system according to the description herein, it is possible to compensate for temperature influences in the measuring cameras which are able to change the distance of the base, which is often manufactured from aluminum, between the two stereoscopic cameras. This makes it possible to ensure high precision of the measured values obtained. The scale problem resulting from the temperature influences acting on the measuring units, for example, solar rays hitting the measuring units, is solved accordingly.

A second significant mark therefore offers the advantage that scale errors of the measuring system are avoided and the longitudinal center plane of the motor vehicle may be accurately determined as a reference for the partial toe of the rear wheels. It is possible to eliminate a measurement of the scale information before each chassis alignment; scale monitoring and scale correction are continuous, since the targets are constantly visible during the chassis alignment.

According to one specific embodiment of the present invention, the distance between the second significant mark and the first significant mark and the distance between the second significant mark and a reference plane are known. This results in a further improvement of scale monitoring and scale correction.

According to another specific embodiment of the present invention, the undetermined mark(s) and the at least one significant mark are each the same distance from the front side of the target. As an alternative, the undetermined mark(s) on the target may be a first distance from the front side of the target and the at least one significant mark may be a different distance from the front side of the target. In the case of two significant marks, they may be an equal or a different distance from the front side of the target. Finally, the significant mark(s) and the undetermined mark(s) may each be different distances from the front side of the target.

According to another specific embodiment of the present invention, the at least one significant mark may lie in the plane of the full-floating axle, resulting in simplifications of the design and manufacturing.

The exemplary embodiments and/or exemplary methods of the present invention also relates to a set of at least two target systems for optical chassis alignment, each of which is provided for attachment to one wheel of a motor vehicle.

In the simplest specific embodiment of the present invention, each set of target systems may include two target systems which are attached to the wheels of one axle of a motor vehicle. The target systems on the other axle or on the other axles of the motor vehicle may be different from the set of target systems according to the present invention.

Similarly, each set of target systems according to the present invention may include four target systems, which are attached to the wheels of a motor vehicle. In the case of three-axle or multi-axle motor vehicles, in particular in trucks, a set of target systems according to the present invention may include six or more target systems.

In the case of the target system set as recited in FIG. 12, each of the target systems is designed according to the description(s) herein and the distance between the first significant mark and the second significant mark is unknown for all targets of the individual wheels or at least for the targets of the wheels of one axle, but is identical in each case. This results in a further simplification.

Sets of target systems may also be formed from two, four or six target systems according to the descriptions herein.

The device according to the present invention according to the description herein is simple to operate and delivers very accurate measured values.

The device according to the present invention according to the description herein makes it possible to ascertain the wheel axis of rotation and the center of rotation of the wheel using exactly one monoscopic or stereoscopic recording of at least three marks of the respective target in a local 3D coordinate system which was previously determined in a calibration step, and this may be used to determine the longitudinal plane of the vehicle.

According to one advantage of the axle alignment device according to the description herein, the distance between the second significant mark and the first significant mark for all targets of the individual wheels or for the targets of the wheels of one axle does not have to be known as long as it is identical for all targets considered.

The exemplary embodiments and/or exemplary methods of the present invention are elucidated in greater detail below based on exemplary embodiments with reference to the appended drawings.

DETAILED DESCRIPTION

Figure 1:
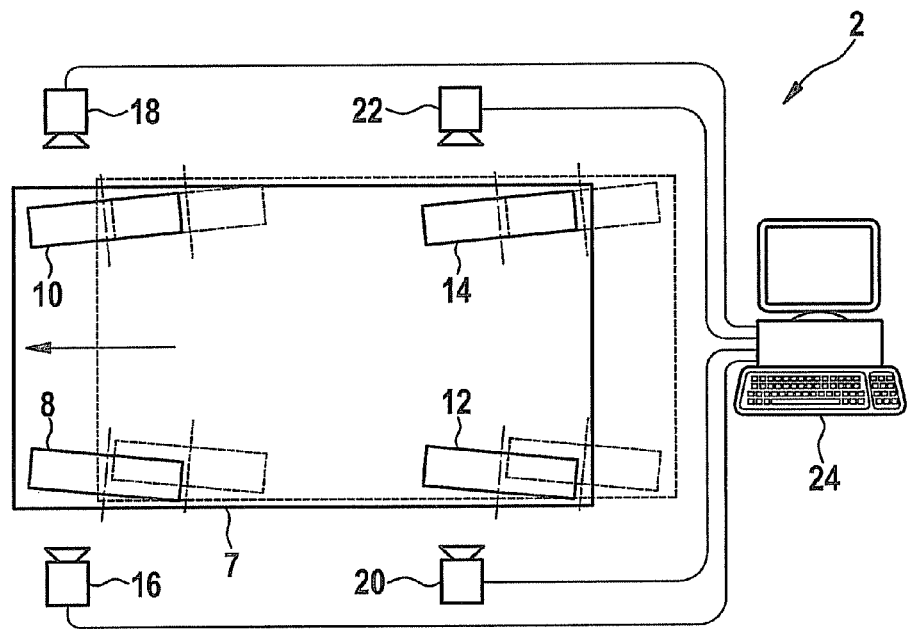
FIG. 1 shows a schematic diagram of a top view of a measuring station having a motor vehicle standing on it.

FIG. 1 shows a schematic diagram of a top view of a measuring station 2 having a motor vehicle 7 standing on it. Front wheels 8 and 10 and rear wheels 12 and 14 are shown having a toe-in angle with respect to the longitudinal center axis of the vehicle, and the body of motor vehicle 7 is only shown as a schematic outline for a better rendering.

The axes of rotation of wheels 8 through 14 are each suggested by dot-dashed lines. Situated next to wheels through 14 are measuring heads 16, 18, 20 and 22, each of which having a stereoscopic measuring camera system, which is not shown in FIG. 1, and is capable of recording motor vehicle wheel 8 through 14 or a section thereof or targets attached to wheels 8 through 14 or sections thereof. Furthermore, a data processing unit 24 which is connected to measuring heads 16 through 22 and receives measuring data from them for evaluation is provided.

Shifted slightly to the right, motor vehicle 7 is shown in a previous vehicle position having its wheels 8 through 14 indicated by dotted lines.

Figure 2:
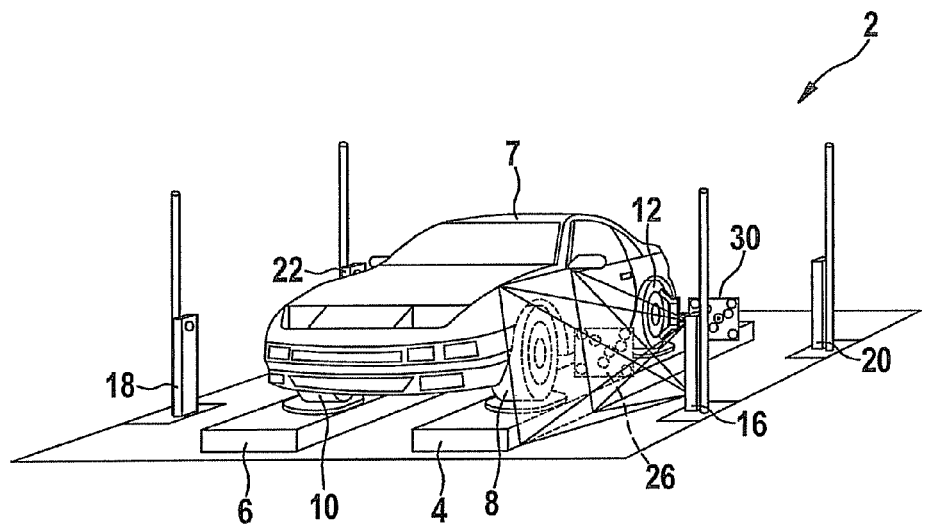
FIG. 2 shows a schematic perspective view of a measuring station having a motor vehicle standing on running rails.

FIG. 2 shows a schematic perspective view of a measuring station 2 having a motor vehicle 7 standing on running rails 4 and 6.

It may be seen that front wheels 8 and 10 and left rear wheel 12 of motor vehicle 7 are each standing on rotary tables of running rails 4 and 6 and that target systems 26 and 30 are fastened to left wheels 8 and 12 of motor vehicle 7, the targets of the target systems pointing essentially outward and being provided with marks.

Measuring heads 16 through 22 are designed in the shape of columns and include, for example, a stereo camera system, i.e., one upper and one lower measuring camera each, which are oriented to each diametrically opposed wheel 8 through 14 and are able to optically detect a target attached to it.

Both measuring cameras of a measuring head 16 through 22 form a stereo system or a stereoscopic image recording device. The fields of view of the measuring cameras of front left measuring head 16 are visualized in FIG. 2.

In the calibration step of measuring station 2, the measuring cameras of measuring heads 16 through 22 deliver an image sequence of at least three images which are recorded when vehicle 7 moves on running rails 4 and 6. From the image data for each wheel 8 through 14, evaluation unit 24 calculates a local 3D coordinate system, the axis of rotation and the center of rotation of wheel 8 through 14.

In doing so, the two-dimensional image coordinates of the marks on targets 26-32 in the individual images of the image sequence are measured. Beyond the image sequence, the corresponding marks are assigned, i.e., the marks are tracked. To this end, codings may be attached to the marks on the targets or standard methods from image processing may be used.

The measuring data evaluation is based on the following mathematical model:

Marks $M_1 \ldots M_n$ (i=1 ... n) of the respective target are recorded by the respective camera in an image sequence (image number j=1 ... m) during pass-by. The positions of the marks in the camera image at point in time j of the image sequence is $x'_{ij}$. From coordinates $x'_{ij}$ of a stereoscopic image pair, it is possible to use standard image processing methods to determine 3D coordinates $X_i$ (i=1 ... n) of the marks in a local wheel coordinate system. From the evaluation of the entire image sequence, it is possible to determine the movement parameters (rotation $R_j$, translation $t_j$) of wheels 8 through 14 at image recording point in time t and additionally to improve the accuracy of the 3D coordinates of the marks.

In the case of monoscopic image recording systems, instead of the stereoscopic determination of the 3D coordinates from single image pairs, it is possible to determine the 3D coordinates of the marks directly as part of the evaluation of the image sequence for determining the movement parameters, according to the principle of structure from motion, which is known to those skilled in the art.

It is possible to use geometric calculations to determine the axis of rotation and the center of rotation of the wheel in the local wheel coordinate system from the 3D coordinates of the marks on the target and the movement parameters.

The necessary parameters, e.g., toe-in and camber values, are determined in the subsequent actual chassis alignment.

The measuring data evaluation may be performed separately for all four individual wheels 8 through 14, i.e., per wheel, jointly for diametrically opposed wheels 8 and 10 as well as 12 and 14, i.e., per axle, or jointly for all wheels 8 through 14, i.e., in a common vehicle evaluation. In the per axle evaluation and the total vehicle evaluation, a temporal synchronization of the image recordings must be produced.

Figure 3:
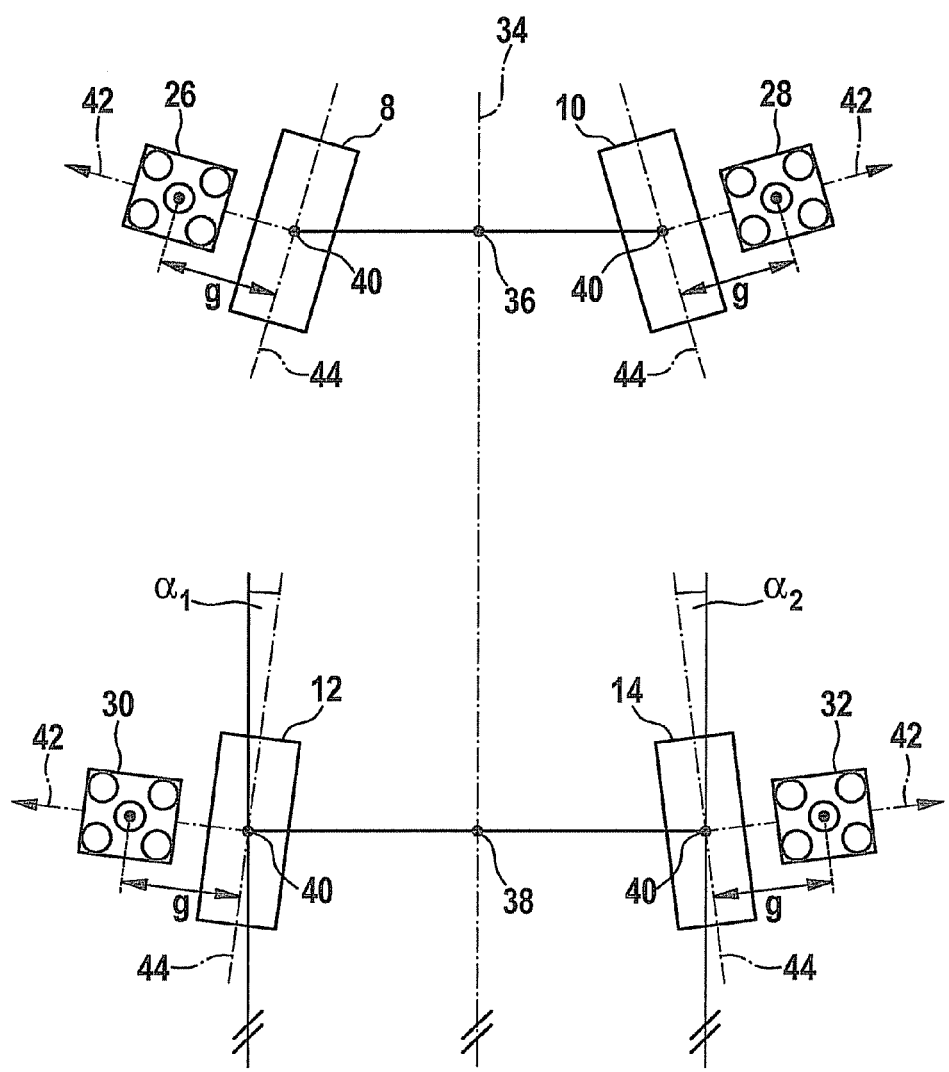
FIG. 3 shows a schematic diagram of a motor vehicle chassis having targets attached to its wheels.

FIG. 3 shows a schematic diagram of a motor vehicle chassis having targets 26 through 32 attached to wheels 8 through 14. The target mounting elements used for fastening targets 26 through 32 to wheels 8 through 14 are not shown for the sake of simplicity. Wheel axis of rotation 42 and wheel center plane 44, which is defined as the center plane of the wheel rim perpendicular to the wheel axis of rotation, are shown for each wheel 8 through 14. Furthermore, centers of rotation 40 of wheels 8 through 14 are shown, each of which being defined as a point of intersection of wheel axis of rotation 42 with wheel center plane 44. The track width of the front axle is obtained from the connection of the two centers of rotation 40 of front wheels 8 and 10, and the track width of the rear axle is obtained from the connection of the two centers of rotation 40 of rear axles 12 and 14. The center of the track width of the front axle is identified by reference numeral 36 and the center of the track width of the rear axle is identified by reference numeral 38. Furthermore, longitudinal center plane 34, which is obtained from the connection of the center of the track width of front axle 36 and the center of the track width of rear axle 38 may be seen in FIG. 3. Parallels to the longitudinal center plane are drawn through wheel centers of rotation 40 of rear wheels 12 and 14. The angle between these parallels and wheel center plane 44 of rear wheels 12 and 14 forms toe-in angle $\alpha_1$ of left rear wheel 12 and toe-in angle $\alpha_2$ of right rear wheel 14. The representation of longitudinal center plane 34 according to FIG. 3 corresponds to the definition according to DIN 70 000.

Each of targets 26 through 32 is provided with a significant mark, for example centered in FIG. 3, the mark being a known distance g from wheel center plane 44. The significant mark being known distance g from wheel center plane 44 and ascertained axis of rotation 42 make it possible to determine the coordinates of center of rotation 40 for each wheel 8 through 14.

Figure 4:
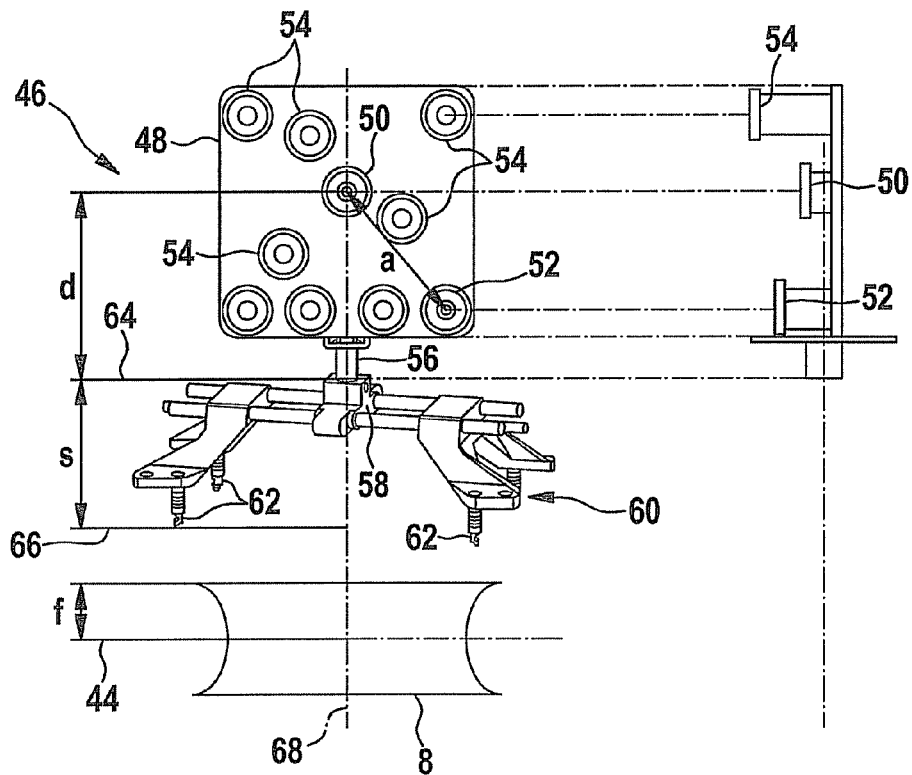
FIG. 4 shows a schematic perspective view of a first target system for attachment to a wheel rim shown schematically under it and a schematic side view of the target of the target system, according to one exemplary embodiment of the present invention.

FIG. 4 shows a schematic perspective view of a first target system 46 for attachment to a rim of a wheel 8 shown schematically under it and a schematic side view of target 48 of target system 46.

Target system 46 includes a target 48 designed, for example, as a square in FIG. 4, the target being fastened in a receiving element 58 of a target mounting element 60 using a bolt 56. Target mounting element 60 includes three rails or bars, on which two clamping elements are movably situated, on which downward pointing mounting bolts 62 are installed, via which target mounting element 60 is able to be fastened to wheel rim 8, suggested as being located under the target mounting element, and in particular being firmly clamped to its rim horn. Target mounting element 60 also has a stop for bolt 56 of target 48 on receiving element 58, the stop forming reference level 64.

The stop for reference level 64 is at an equal distance s for all target mounting elements 60, measured with respect to a contact surface 66 on mounting bolts 62, via which target mounting elements 60 are in contact with the rim horn of wheel rim 8.

Furthermore, a distance f between contact surface 66 for mounting bolts 62 on the rim horn and a wheel center plane 44 is known. Distance f is vehicle-specific.

A first significant mark 50 is situated at approximately the center of the front side of target 48. First significant feature 50 is at a calibrated distance d, measured along full-floating axle 68, with respect to reference plane 64. This distance d is measured in particular between the feature center of first significant mark 50 and reference plane 64. Distances d, s and f and/or total distance g=d+s+f of first significant mark 50 from wheel center plane 44 are known to evaluation unit 24.

The knowledge of distance g is necessary in order to ascertain the longitudinal center plane of the vehicle 34 for the vehicle to be aligned in the measuring station reference system in a measurement described later.

Furthermore, a second significant mark 52 is provided in the right lower area on the front side of target 48. Second significant mark 52 is a calibrated distance a from first significant feature 50, this distance a being measured between the feature centers of marks 50 and 52. This distance a is also known to evaluation unit 24.

Remaining marks 54 distributed by way of example on the front side of target 48 in FIG. 4 are undetermined, i.e., neither their position nor their distance from one another are known to evaluation unit 24.

Marks 50, 52 and 54 each contain a circular centered feature that may be a dark color, for example, black, a circular ring in particular of a bright color, for example, reflective color, surrounding the centered feature, and a narrower outer circular ring of an in particular dark color, for example, the same color as the centered feature, surrounding this circular ring. Such marks, in particular their circular, centered feature, may be readily detected optically against the bright background of the circular ring surrounding it.

The side view of target 48 shows that the target plate is offset slightly to the rear in relation to full-floating axle 68 (i.e., to the right in FIG. 4), and marks 50, 52 and 54 are each designed as column sections having mark disks on their front side. While the column sections of undetermined marks 54 are designed to be the longest so that the mark disks of undetermined marks 54 are situated the furthest to the front from the target plate, the column section of second significant mark 52 is slightly shorter and the column section of first significant 50 mark is designed to be even shorter so that second significant mark 52 lies in a plane behind undetermined marks 54 and first significant mark 50 lies in another plane which is set back in relation to the planes of undetermined marks 54 and second significant mark 52. In the side view according to FIG. 4, only three of the marks present on the front side of target 48 are shown for the sake of simplicity.

In an alternative specific embodiment not shown here, undetermined marks 54 may also lie in two or more different planes.

Figure 5:
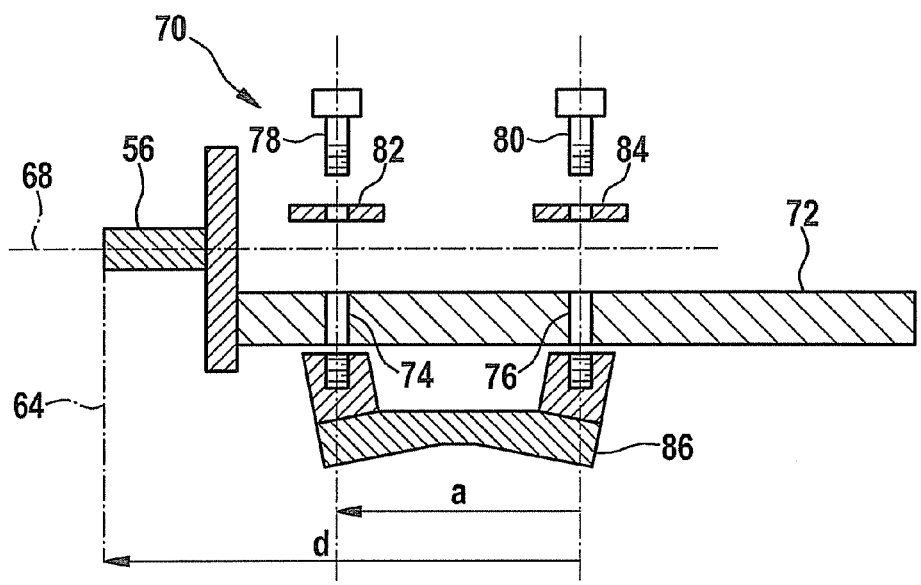
FIG. 5 shows a schematic sectional view of a target system according to another exemplary embodiment of the present invention, the target mounting element of the target system being omitted.

FIG. 5 shows a schematic sectional view of a target system 70, the target mounting element of target system 70 being omitted.

In relation to bolt 56 and full-floating axle 78, target disk 72 is offset slightly to the rear (i.e., downwards in FIG. 5), and it is provided with two alignment bores 74 and 76, first alignment bore 74 being present in a lower area (i.e., to the left in FIG. 5), and second alignment bore 76 being present in a center area of target plate 72. Alignment pins 78 and 80 are inserted into each of alignment bores 74 and 76 from the front in such a way that their widened heads press shim rings 82 and 84 onto the front side of target plate 72 and fix and center them there in a precise position, and their front sides provided with threads protrude from the rear of target plate 72 so that a handle 86 may be fastened to the back side of target plate 72.

Shim rings 84 and 82 define the two significant, optically measurable marks, each center point of which marks the measuring point.

Distance d of the first significant mark from reference plane 64 and distance a between the two significant marks, both of which are known to evaluation unit 24, are also shown in FIG. 5.

In the case of target 70, shim rings 82 and 84 lie in one plane which passes behind (i.e., below in the drawing) full-floating axle 68.

In the case of this exemplary embodiment, the distance of the two significant marks is predefined with adequate accuracy from the design and the manufacturing process of target 70 and the target mounting element situated under it (not shown in FIG. 5). As a result, the calibration of the distance may be advantageously omitted and the handling simplified, in particular due to the fact that the distances of the marks formed by the alignment pins and shim rings are identical in all target systems and targets. The targets may be exchanged with one another in any manner.

As an alternative to providing a handle 86, alignment pins 78 and 80 may also be simply countered by nuts and fastened on the back side of target plate 72.

In the side view of target 70 according to FIG. 5, only two significant features are shown for the sake of simplicity. Additional undetermined marks may be attached, e.g., adhered, to the front side of target plate 72 in any manner.

Figure 6:
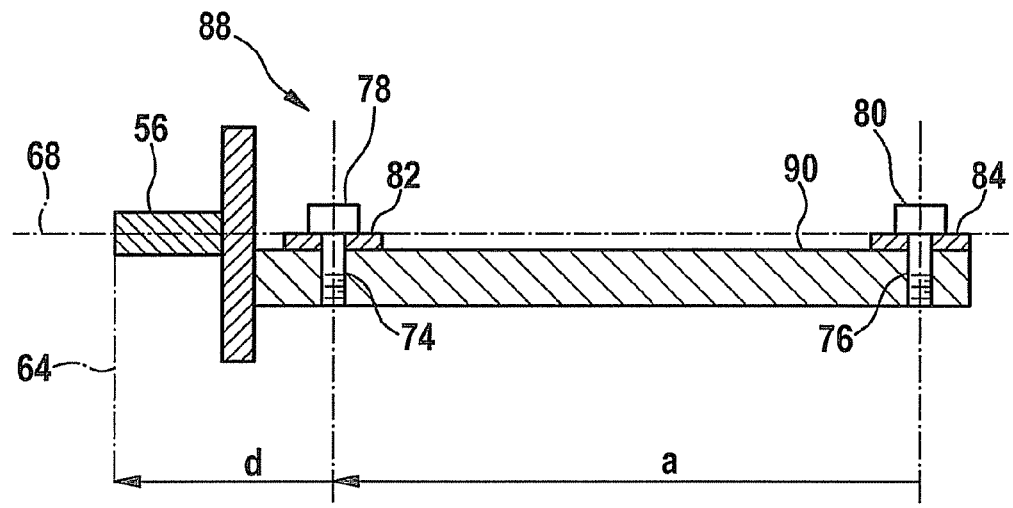
FIG. 6 shows a schematic sectional view of a target system according to another exemplary embodiment of the present invention, the target mounting element of the target system being omitted.

FIG. 6 shows a schematic sectional view of a target system 88, which largely corresponds to first target system 70 with respect to its design, the target mounting element being omitted.

In the case of target system 88, no handle is provided on the back side of target plate 90; the threads of alignment pins 78 and 80 engage with the corresponding threads of alignment bores 74 and 76, thus fixing themselves and shim rings 82 and 84 in position. The first significant mark formed by alignment pin 78 and shim ring 82 is located in a lower area (shown to the left in FIG. 6) and the second significant mark formed by alignment pin 80 and shim ring 84 is located in an upper area of target plate 90 (thus to the right in FIG. 6). Accordingly, distance d between the first significant mark and the reference plane is minimal and possible deformations of target 88 only have a minimal effect on the position of the first significant mark in relation to the full-floating axle or axis of rotation 68. Similarly, distance a between the two significant marks is as large as possible; as a result, the tolerance of the setpoint distance has a minimum influence on the measuring results, since the remaining error is inversely proportional to the length of the setpoint distance.

In the case of target 88, shim rings 82 and 84 lie in the plane which passes through full-floating axle 68.

Figure 7:
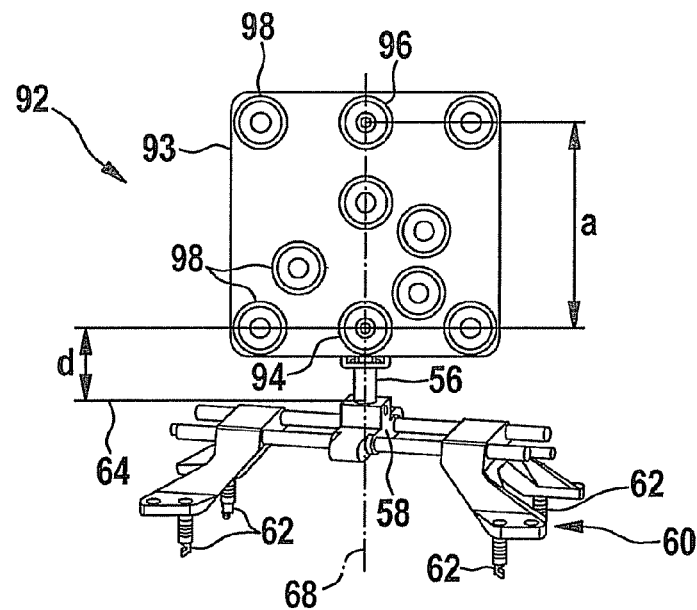
FIG. 7 shows a schematic perspective view of a target system according to another exemplary embodiment of the present invention.

FIG. 7 shows a schematic perspective view of a target system 92.

This target system 92 largely corresponds to target system 46 from FIG. 4, except that both significant marks 94 and 96 lie on full-floating axle 68, first significant mark 94 lies in a lower area of target 93 and second significant mark 96 lies in an upper area of target 93.

To minimize the temperature influence, the target systems according to the present invention may be manufactured from a material having low temperature expansion coefficients, for example, carbon fiber.

If the assembly of the target systems ensures that all targets have both an identical distance d between the first significant mark and the reference plane, i.e., also an identical distance a between the two significant marks, this is adequate for the determination of the longitudinal center plane of the vehicle; exact knowledge of these distances may be omitted. Distance d may be stored in the evaluation unit once and assumed to be equal for all targets. If the actual distance deviates from the stored distance due to design changes of the target, the centers of rotation will not lie in the physical wheel center plane. Due to the symmetrical positioning of the four wheels, the effect on the determination of the longitudinal center plane is minimal as long as distances d deviate from the stored value by the same value in all targets. For that reason, it is not necessary to change the evaluation software running on the evaluation unit.

This applies by analogy to distance a between the two significant targets. If the actual distance deviates from the stored distance due to design changes of the target, the measuring results will be falsified for all wheels by the same factor. This has no influence on the angle calculation and accordingly on the calculation of the longitudinal center plane of the vehicle. Thus only the less relevant measured quantities such as track width and wheelbase may not be determined as accurately.

Temperature influences are compensated in a similar manner as long as all wheel adapters are exposed to the same temperature changes.

Figure 8:
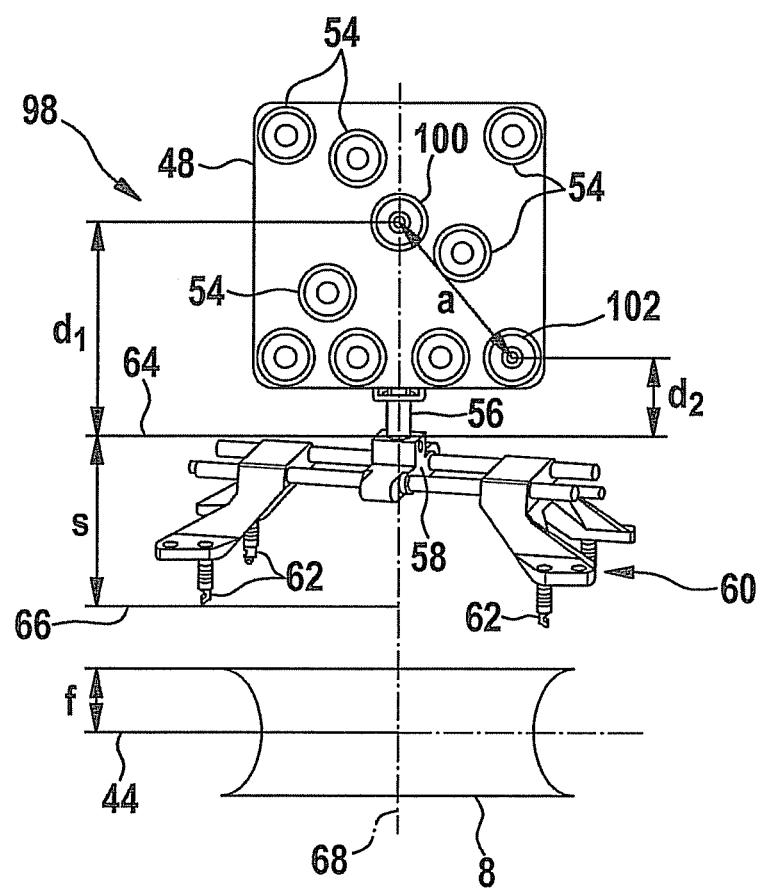
FIG. 8 shows a schematic perspective view of a target system according to another exemplary embodiment of the present invention.

FIG. 8 shows a schematic perspective view of a target system 98.

This target system 98 largely corresponds to target system 46 from FIG. 4, it not being necessary for significant marks 100 and 102 to lie further back compared to undetermined marks 54, as is the case in FIG. 4, but instead may lie in one plane with them.

In the case of target 48 of target system 98, distance d1 of first significant mark 100 from reference plane 64 is known, and also distance d2 of second significant mark 102 from reference plane 64 is known. Accordingly, total distance g=d1+s+f from wheel center plane 44 resulting for the first significant mark is also known to evaluation unit 24. Similarly, total distance g=d2+s+f of second significant mark 102 from wheel center plane 44 is also known to evaluation unit 24. The knowledge of this total distance g is necessary in order to ascertain the longitudinal center plane of the vehicle 34 for the vehicle to be aligned in the measuring station reference system in a measurement described previously.

As in FIG. 4, marks 54 distributed by way of example on the front side of target 48 in FIG. 8 are also undetermined, i.e., neither their position nor their distance from one another is known to evaluation unit 24. The embodiment of marks 50, 52 and 54 corresponds to the embodiment described with reference to FIG. 4, which will not be repeated here again.

Distance a between first significant mark 100 and second significant mark 102 is visualized in FIG. 8 by an arrow bearing reference symbol a.

In a first specific embodiment of target system 98, this distance a is known to evaluation unit 24.

The fact that in the case of target systems 98 used on the wheels of the motor vehicle for chassis alignment, total distances g of both significant marks 100 and 102 from wheel center plane 44 and the distance of both significant marks 100 and 102 with respect to one another are known, the calibration step makes it possible to determine the local 3D coordinate system of the marks of the targets in a particularly reliable manner, and the subsequent chassis alignment delivers very precise measured values.

According to an alternative specific embodiment of target system 98, distance a between both significant marks 100 and 102 is not known to evaluation unit 24; however, this distance a is identical in all target systems 98 of the four target systems on the individual wheels of the motor vehicle or at least in target systems 98 of the wheels of one axle of the motor vehicle.

Total distances g of both significant marks 100 and 102 from wheel center plane 44 which are known to evaluation unit 24 and distance a between both significant marks 100 and 102 which is consistent in target systems 98 an the wheels of the motor vehicle or at least on the same axle of the motor vehicle make it possible to determine the local 3D coordinate system of the marks of the targets in the calibration step also very reliably, and the subsequent chassis alignment delivers very accurate measured values.

What is claimed is:

1. A set of at least two target systems for providing optical chassis alignment which are attachable to wheels of a vehicle, comprising:
    one target, for each of the at least two target systems;
    one target mounting element, for each of the at least two target systems, having a target receiving element to which the target is attached, wherein the target mounting element is attachable to one of the wheels of the motor vehicle so that the target is aligned at an angle to the wheel center plane;
    wherein, a first significant mark, which is at a known distance from a reference plane, a second significant mark, which is at a known distance from the reference plane, and at least one additional undetermined mark are situated on the target, and
    wherein the distance of the first significant mark from the second significant mark is unknown for all targets of the individual wheels or for the targets of the wheels of one axle, but is identical in each case.

2. The set of at least two target systems of claim 1, wherein the first significant mark and the second significant mark are each situated on diametrically opposite edge areas on the front side of the target.

3. The set of at least two target systems of claim 1, wherein the first significant mark and the second significant mark are each a different distance from the front side of the target.

4. The set of at least two target systems of claim 1, wherein each of the first significant mark and the second significant mark are a different distance from the front side of the target than the at least one undetermined mark.

5. The set of at least two target systems of claim 1, wherein each of the first significant mark and the second significant mark and the at least one undetermined mark are each the same distance from the front side of the target.

6. The set of at least two target systems of claim 1, wherein each of the first significant mark and the second significant mark lies on a full-floating axle.

7. The set of at least two target systems of claim 1, wherein at least one of the following is satisfied: (i) each of the first significant mark and the second significant mark are configured as dark circular areas which are surrounded by a bright background, and (ii) the bright background is configured as a circular ring and/or to be reflective.

8. The set of at least two target systems of claim 1, wherein at least one of the following is satisfied: (i) each of the first significant mark and the second significant mark is configured as an alignment pin having a shim ring inserted into an alignment bore of the target, and (ii) a handle is attached to an alignment pin protruding from the back side of the target.

9. The set of at least two target systems of claim 1, wherein the distance of the first significant mark from a wheel center plane is known, the distance being made up of the known distance of the significant mark from a reference plane, a known distance between the reference plane and a clamping plane and a known distance from the clamping plane to the wheel center plane through a wheel rim.

* * * * *

UNITED STATES PATENT AND TRADEMARK OFFICE
CERTIFICATE OF CORRECTION

PATENT NO. : 8,650,766 B2  Page 1 of 1
APPLICATION NO. : 13/063437
DATED : February 18, 2014
INVENTOR(S) : Nobis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Twenty-ninth Day of September, 2015

Michelle K. Lee
*Director of the United States Patent and Trademark Office*